US008719778B2

(12) United States Patent
Dorn et al.

(10) Patent No.: US 8,719,778 B2
(45) Date of Patent: May 6, 2014

(54) INTERCONNECTION INTERFACE FOR FLEXIBLE ONLINE/OFFLINE DEPLOYMENT OF AN N-LAYERED SOFTWARE APPLICATION

(75) Inventors: Karlheinz Dorn, Kalchreuth (DE); Ralf Hofmann, Puschendorf (DE)

(73) Assignee: Siemens Aktiengesellschaft, Munich (DE)

( * ) Notice: Subject to any disclaimer, the term of this patent is extended or adjusted under 35 U.S.C. 154(b) by 1096 days.

(21) Appl. No.: 11/878,093

(22) Filed: Jul. 20, 2007

(65) Prior Publication Data
US 2008/0028384 A1 Jan. 31, 2008

(30) Foreign Application Priority Data

Jul. 21, 2006 (DE) .......................... 10 2006 033 863

(51) Int. Cl.
G06F 9/44 (2006.01)
G06F 9/445 (2006.01)

(52) U.S. Cl.
USPC ............................. 717/119; 717/164; 717/175

(58) Field of Classification Search
None
See application file for complete search history.

(56) References Cited

U.S. PATENT DOCUMENTS

| 5,093,916 | A | * | 3/1992 | Karp et al. ..................... 717/164 |
| 5,457,797 | A | * | 10/1995 | Butterworth et al. ......... 719/320 |
| 6,026,238 | A | | 2/2000 | Bond et al. |
| 6,233,731 | B1 | | 5/2001 | Bond et al. |
| 6,496,847 | B1 | | 12/2002 | Bugnion et al. |
| 6,499,137 | B1 | * | 12/2002 | Hunt ............................. 717/164 |
| 6,671,745 | B1 | | 12/2003 | Mathur et al. |
| 6,704,807 | B1 | | 3/2004 | Mathur et al. |
| 6,725,453 | B1 | * | 4/2004 | Lucas et al. .................... 717/178 |

(Continued)

FOREIGN PATENT DOCUMENTS

| DE | 699 08 121 T2 | 4/2004 |
| DE | 698 19 188 T2 | 5/2004 |
| WO | WO-02/07037 A1 | 1/2002 |

OTHER PUBLICATIONS

Nat Pryce, et al., "Component Interaction in Distributed Systems", 1998, Proceedings of 4$^{th}$ Intl' conf. on Configurable Distributed Systems, [online], [retrieved on Mar. 25, 2011]. Retrieved from the Internet <URL:http://ieeexplore.ieee.org/xpls/abs_all.jsp?arnumber=675760&tag=1]. pp. 1-8.*

(Continued)

Primary Examiner — Xi D Chen
(74) Attorney, Agent, or Firm — Harness, Dickey & Pierce, P.L.C.

(57) ABSTRACT

A method is disclosed for producing a software application with at least two layers, including a processing layer and a process layer, wherein each layer is encapsulated and hence platform-independent in its execution, the encapsulated layers communicating via an application programming interface. A system is also disclosed for producing an application including a flexible interconnection interface between encapsulated layers. By virtue of the implementation of an additional configurable interconnection interface in the application programming interface between two encapsulated application layers, the architecture layering can be retained regardless of the respective deployment, and only the communication profiles of the interconnection interfaces need be adapted to the deployment. This has the advantage, in at least one embodiment, that it is not necessary to produce and update different source code masters for the different deployments, and instead only one single architecture layering of the application need be created and maintained.

15 Claims, 3 Drawing Sheets

(56) References Cited

U.S. PATENT DOCUMENTS

| | | | |
|---|---|---|---|
| 6,775,671 B1* | 8/2004 | de Lara et al. ................... 1/1 |
| 6,810,517 B2 | 10/2004 | Bond et al. |
| 6,832,381 B1* | 12/2004 | Mathur et al. .................. 719/328 |
| 6,836,880 B1* | 12/2004 | Dorn et al. ..................... 717/120 |
| 6,996,800 B2* | 2/2006 | Lucassen et al. ............... 717/106 |
| 7,076,633 B2* | 7/2006 | Tormasov et al. .............. 711/203 |
| 7,082,598 B1* | 7/2006 | Le et al. ......................... 717/127 |
| 7,111,291 B2* | 9/2006 | Loy et al. ....................... 717/164 |
| 7,143,164 B2* | 11/2006 | Antonov et al. ................ 717/164 |
| 7,174,379 B2* | 2/2007 | Agarwal et al. ................ 717/164 |
| 7,412,702 B1* | 8/2008 | Nelson et al. ...................... 718/1 |
| 7,490,332 B2* | 2/2009 | Sesma ............................ 719/315 |
| 7,506,338 B2* | 3/2009 | Alpern et al. ................... 717/177 |
| 7,533,117 B2* | 5/2009 | de Lara et al. ....................... 1/1 |
| 7,747,698 B2* | 6/2010 | Kovachka-Dimitrova et al. ............................. 709/218 |
| 7,774,757 B1* | 8/2010 | Awasthi et al. ................ 717/127 |
| 8,141,032 B2* | 3/2012 | Joo et al. ........................ 717/104 |
| 8,161,393 B2* | 4/2012 | Gillingham et al. ........... 715/736 |
| 8,286,158 B2* | 10/2012 | Hamid et al. ................... 717/175 |
| 8,286,198 B2* | 10/2012 | Munshi et al. ................. 717/119 |
| 8,365,164 B1* | 1/2013 | Morgenstern .................. 717/175 |
| 8,432,403 B2* | 4/2013 | Kota et al. ...................... 717/119 |
| 8,432,404 B2* | 4/2013 | Kota et al. ...................... 717/119 |
| 8,441,488 B2* | 5/2013 | Kota et al. ...................... 717/119 |
| 8,516,360 B2* | 8/2013 | Mondal et al. ................. 717/119 |
| 8,584,113 B2* | 11/2013 | McCurdy et al. .............. 717/175 |
| 2001/0008023 A1 | 7/2001 | Bond et al. |
| 2002/0091854 A1 | 7/2002 | Smith |
| 2002/0095525 A1* | 7/2002 | Fables et al. ................... 717/107 |
| 2003/0078960 A1* | 4/2003 | Murren et al. .................. 709/203 |
| 2003/0093402 A1* | 5/2003 | Upton ................................ 707/1 |
| 2005/0066324 A1* | 3/2005 | Delgado et al. ................ 717/175 |
| 2005/0071855 A1 | 3/2005 | Mathur et al. |
| 2005/0108218 A1 | 5/2005 | Mathur et al. |
| 2006/0206889 A1* | 9/2006 | Ganesan et al. ................ 717/175 |
| 2007/0150855 A1* | 6/2007 | Jeong ............................. 717/106 |
| 2008/0141139 A1* | 6/2008 | Murren et al. .................. 715/744 |

OTHER PUBLICATIONS

Nathaniel G. Pryce, "Component Interaction in Distributed Systems", Jan. 2000, Ph.D. thesis, Imperial College of Science, Technology and Medicine, University of London, Department of Computing, [online]. [retrieved on Mar. 25, 2011]. Retrieved from the Internet <URL:http://www.doc.ic.ac.uk/~np2/thesis.pdf]. pp. 1-176.*

Jarry J. Foxwell, Isaac Rozenfeld, "Slicing and Dicing Servers A Guide to Virtualization and Containment Technologies", 2005, published on Internet; [retrieved on Sep. 15, 2011]; Retrieved from Internet <URL:http://cora.filibeto.org/sun/lib/blueprints/819-3734.pdf>; pp. 1-17.*

Mehmet Aksit, Zied Choukair, "Dynamic, Adaptive and Reconfigurable Systems Overview and Prospective Vision", 2003 IEEE, [retrieved on Sep. 15, 2011]; Retrieved from Internet <URL:http://ieeexplore.ieee.org/stamp/stamp.jsp?tp=&arnumber=1203537>; pp. 1-6.*

Vogel, "Service Abstraction Layer", Proceeding of EuroPlop 2001; [retrieved on Apr. 26, 2013]; Retrieved from Internet<URL:http://hillside.net/europlop/HillsideEurope/Papers/EuroPLoP2001/2001_Vogel_ServiceAbstractionLayer.pdf>;pp. 1-16.*

Bastide, "A Refactoring-based Tool for Software Component Adaptation", 2006 IEEE; [retrieved on Dec. 14, 2013]; Retrieved from Internet <UrL:http://ieeexplore.ieee.org/stamp/stamp.jsp?tp=&arnumber=1602386>;pp. 1-4.*

Grammtikou, et al., "GEMBus as a Service Oriented Platform for Clud-Based Composable Services"; 2011 IEEE; [retrieved on Dec. 14, 2013]; Retrieved from Internet <UrL:http://ieeexplore.ieee.org/stamp/stamp.jsp?tp=&arnumber=6133212>;pp. 666-671.*

Gabriel, Goldman, "Conscientious Software"; OOPSLA 2006, ACM;[retrieved on Dec. 14, 2013]; Retrieved from Internet <UrL:http://dl.acm.org/citation.cfm?id=1167473>;pp. 433-450.*

Fleissner, Baniassad, "Epi-Aspects: Aspect-Oriented Conscientious Software" 2007 ACM; [retrieved on Dec. 14, 2013]; Retrieved from Internet <UrL:http://dl.acm.org/citation.cfm?id=1297076>;pp. 659-673.*

De Braaf, J.; Java Web Services. Im : Seminar Softwaretechnik WS 2004/05. Universität Münster. Institut für Wirtschaftsinformatik—Praktische Informatik. http://www-wi.uni-muenster.de/pi/lehre/ws0405/seminar/02JavaWebServices.pdf.

de Braaf, J.; Seminar "Softwaretechnik" WS 2004/05. Universität Münster. Institut für Wirtschaftsinformatik—Praktische Informatik; Others.

Nat. Pryce et al.: "Component Interaction in Distributed Systems", 1998, Proceedings of 4th Int. Conf. on Configurable Distributed Systems, (online), retrieved on Mar. 25, 2011, Retrieved from the Internet, URL:http://ieeexplore,ieee.org/xpls/abs_all.jsp?arnumber=675760&tag=1), p. 1-8; Others; 1998.

Nat. Pryce: "Component Interaction in Distributed Systems", Jan. 2000. Ph.D. thesis, Imperial College of Science, Technology and Medicine, Univ. of London, Department of Computing (online), retrieved on Mar. 25, 2011, Retrieved from the Internet, URL:http://www.doc.ic.ac.uk/-np2/thesis.pdf, p. 1-176; Others; 2000.

German OA dated Apr. 3, 2007.

Chinese OA and English translation dated Jun. 27, 2011.

de Braaf, J.; Seminar "Softwaretechnik" WS 2004/05. Universität Münster. Institut für Wirtschaftsinformatik—Praktische Informatik; Others; and English translation.

Nat. Pryce: "Component Interaction in Distributed Systems", Jan. 2000, Ph.D. thesis, Imperial College of Science, Technology and Medicine, Univ. of London, Department of Computing (online), retrieved on Mar. 25, 2011, Retrieved from the Internet, URL:http://www.doc.ic.ac.uk/~np2/thesis.pdf, p. 1-176; Others; 2000.

* cited by examiner

INTERCONNECTION INTERFACE FOR FLEXIBLE ONLINE/OFFLINE DEPLOYMENT OF AN N-LAYERED SOFTWARE APPLICATION

PRIORITY STATEMENT

The present application hereby claims priority under 35 U.S.C. §119 on German patent application number DE 10 2006 033 863.4 filed Jul. 21, 2006, the entire contents of which is hereby incorporated herein by reference.

FIELD

Embodiments of the invention generally relate to a method for producing an n-layered, i.e. at least two-layered, software application including a processing layer and a process layer. For example, they may relate to one wherein each layer is encapsulated and hence platform-independent in terms of execution, and the encapsulated layers communicate with each other via an application programming interface. Embodiments of the invention also generally relate to a system for producing an application including a flexible interconnection interface within an application programming interface between encapsulated layers.

BACKGROUND

The creation of software applications requires a high degree of programming knowledge and experience on the part of the developer during the design of the software architecture. An application is usually created almost exclusively monolithically and hence as an application block, which must always be changed as a whole when changes are required, e.g. in the context of software updates. This entails a significant cost when the application is created and when it is maintained. Furthermore, these monolithic systems are relatively susceptible to error.

In addition to applications for desktop use, in which the application layers can be executed exclusively on a shared computer, web applications also exist in which the application layers are designed for running on a client-server structure, i.e. on a plurality of computers. Web applications then require the client-server structure, however, and cannot therefore be used without a server.

In conventional application systems, provision is made for an application to access individual libraries in the form of a dynamic or static link, and to be executed within an execution file in the form of an executable. Within this concept, the applications rely on a multiplicity of different services, components and data which are made available to the relevant calling application in different hierarchical layer levels of the underlying software architecture. These services are usually implemented directly in the source code of an application, wherein the services and components sometimes run on different platforms, such as e.g. Windows-based or Linux-based operating systems, and on different runtime locations within a computer network, such as e.g. desktop computers or web-based server-client configurations. Subsequent adaptation or modification of the application to suit changed platform environments and/or other runtime locations, also known collectively as deployment, is not possible due to the respectively different software architecture for the various deployments.

When creating a software architecture for an application, it is therefore problematic that in the event of a change or adaptation to other working environments or to other deployments, it has been necessary until now to adapt the underlying software architecture, which usually requires extensive changes. As part of this, the developer must above all specify the arrangement of the architecture layers of the application on the relevant computer structure of the different deployments anew in each case. In particular, a new software architecture for the application must be defined, and a new source code must be created and complied in an execution file in the form of an executable. These measures entail a significant cost in terms of time and resources for the creation of the respective applications, and currently require the parallel development of different applications having varying computer application software architectures for different deployments.

For this reason, so-called frameworks are provided as support environments for developers, the frameworks frequently encapsulating the individual layers of a software application within a generic runtime environment. An application layer which—embedded in a generic runtime environment—can be run individually and independently of platform and/or runtime location is designated as encapsulated.

The .NET framework of the Microsoft Corporation is an important framework. This framework offers the possibility of utilizing all variety of programming languages such as C#, Visual Basic.NET, C++/CLI or JScript.NET as a basis for programming an n-layered application. Irrespective of the type of programming language that is utilized, the application and/or relevant architecture layer of the application is converted into an "intermediate language" (Microsoft Intermediate Language: MSIL). The application which is thus programmed in the intermediate language is then compiled and converted into an execution file.

The application programming interfaces (API) which are required between the individual layers of the application are very important in this case. A distinction is made between function-oriented, interface-oriented and protocol-oriented application programming interfaces. Unlike function-oriented and interface-oriented application programming interfaces, protocol-oriented application programming interfaces are independent of the operating system of the platform and independent of the type of application layers which must be connected. An application programming interface which has been defined once between two encapsulated layers cannot currently be changed, however, and therefore a separate quasi-monolithic software application is required in each case with reference to the respective deployments.

DE 698 19 188 T2 therefore describes a program interface converter for computers using a plurality of environments. According to the invention claimed therein, a utility program automatically produces and updates code modules for translating application programming interfaces which have been written for one platform, in order that they can be executed correctly on another platform. The utility program, which is executed for each new development step of an operating system or other software environment, works with a range of templates for producing the source code for the translation modules on the basis of the functions which are executed by the application programming interfaces.

DE 699 08 121 T2 likewise describes an application programming interface in an operating system. The invention therein specifies a system containing a set of application programming interfaces for a number of software modules and software components for environments having limited resources. An example of an environment having limited resources is an integral system comprising a multiplicity of consumer devices and specialized industrial controllers including hand-held or palm-size PCs.

All of the methods disclosed in the prior art for producing an n-layered application by way of a framework have the disadvantage that, although the application programming interfaces can be converted with reference to the required platforms and runtime locations, it has not been possible until now to utilize the interaction of the layers via the respective intermediate application programming interfaces, the interaction having been determined for one deployment, for another deployment. Consequently, parallel developments of source code masters are required for the different deployments.

SUMMARY

In at least one embodiment, the present invention therefore addresses the problem of allowing n-layered applications to be developed centrally, independently of the underlying software architecture, with reference to the platforms and runtime locations which are utilized in a computer network.

According to at least one embodiment of the invention, the application programming interface includes a flexible interconnection interface and the flexible interconnection interface, depending on the underlying platforms of the individual encapsulated layers, provides the communication profiles which are required for the communication via the application programming interface between the encapsulated layers. As a result, the underlying software architecture of the application can be utilized independently of the respective deployment. Only the interconnection interfaces which are integrated in the application programming interfaces are adapted to the respective deployment.

Within the meaning of embodiments of the invention, encapsulated layers of an application are hierarchically different levels of a software architecture, the levels being platform-independent and independent of the runtime location within a computer network. The respective encapsulated layers run in particular within a generic runtime environment and interact with each other via the interfaces of the respective generic runtime environment. In the context of different distributions (deployments) of the individual encapsulated layers on various runtime locations within a connectable computer network, the complete application, i.e. containing all application layers, can be distributed either on a single computer in desktop use (or offline use) as a so-called fat client or over various computers within a connectable computer network (online use) as a smart client, rich-thin client, thin (HTML) client or as a web service. In a further deployment variant known as rich client, the application can be operated either in offline use or in online use.

By virtue of the method according to at least one embodiment of the invention, each application which is based on the framework can be operated in the above-described deployments automatically, without the application developer having to develop and maintain various source code masters for the respective software architectures. As a result, an application developer only needs to prepare the fundamental layered architecture of an application once, thereby significantly reducing the development times for the application. At the same time, this allows centralized software development and therefore different software architectures with alternative source code masters do not have to be held and updated for the different deployments.

The utilization of the framework, in conjunction with the implementation of a respectively flexible communication layer within the application programming interface, ensures that the application including encapsulated layers can run both in the desktop mode of a fat client or also in the web mode of a thin (HTML) client, for example. By way of the respective application programming interfaces with a flexible communication layer, the flexible interconnection interface allows data processing and access by the application to the respective services and/or components within the layers, such that the application remains unaware of its current working environment.

In an advantageous embodiment of the method, it is possible for the encapsulated layers to run on different interconnectable runtime locations within a computer network, wherein the application programming interfaces provide the necessary communication profiles between the encapsulated layers and monitor the data communication between the data interfaces of the connectable computer network.

The services and/or components and/or data which are implemented in the encapsulated layers are preferably designed in relation to a standardized application programming interface and/or a standardized data interface. As a result of utilizing consistent standards for creating the relevant services and components within the encapsulated layers, the developer does not have to invest any additional effort in the data processing, data transfer or the management of the services beyond the layer boundaries. Thus, the different encapsulated layers can be programmed in various programming languages, yet the respective services within the encapsulated layers can nonetheless be invoked without additional intermediate processes.

It is also considered advantageous that standardized services are implemented in the encapsulated layers and can be invoked independently in each case.

In an advantageous embodiment of the method, when specifying the deployment in terms of the platforms and the relevant runtime locations within the computer network, the communication profiles which are required in each case for the communication between the individual encapsulated layers are selected automatically. This assists the application developer doing the work and, at the same time, ensures that the respectively required communication profile of the flexible interconnection interface is selected as part of the application programming interface between two encapsulated layers in each case.

The communication profiles of the application programming interface and/or the communication profiles of the data interfaces are implemented dynamically depending on the platforms and runtime locations within the computer network of the encapsulated layers. In particular, using XML or DLL configuration files for the configuration of the flexible interconnection interface, it is possible to compile the application in a manner which is platform-independent and independent of the deployment. Only when the application is used on the respective deployment are the respectively required communication profiles implemented, by way of the XML or DLL configuration file, for the flexible interconnection interfaces in the application programming interfaces between the encapsulated layers. This ensures that the application can be run on each deployment without further compilation or conversion.

According to at least one embodiment of the invention, as its lowest layer, the architecture of the application includes a service layer for providing local and/or external services and/or data for a framework, a data access layer for the access to data and for providing local and/or external data services and communication services, a processing layer for providing processing services and processing components, a process layer for providing a business logic and a service bus and, as its highest hierarchical layer, a presentation layer for presenting the data and presentation components.

In an advantageous embodiment of the method, the application controls the access to the individual encapsulated layers themselves, and can be run in a platform-independent manner as an encapsulated application independently of the respective deployment underlying the software architecture. The encapsulated application can run, and is therefore independent of the respective deployment for the encapsulated layers, in a generic runtime environment.

Either the encapsulated application can be run in a generic runtime environment, or the encapsulated application is caused to execute in a generic runtime environment which runs in a web server. The interaction of the application with the generic runtime environment remains the same in each deployment, however. As a result of this, the application does not have to be changed in the context of various deployments and can be run unchanged both in the desktop deployment and in the web deployment. The design of the encapsulated layers, e.g. the presentation layer, does not change when the application is switched to another deployment—assuming the software architecture of the application remains the same. Therefore the application architecture and the programming language which is utilized likewise remain unchanged. Specifically, the encapsulated layers communicate in each case via an integrated flexible interconnection interface of the respective intermediate application programming interface. If the application is in desktop use, a specific implementation of the communication profiles which is suitable for the desktop use is applied for the flexible interconnection interface. Because the communication between the encapsulated layers always takes place via respective intermediate interconnection interfaces, it is possible to substitute the implementation of the flexible interconnection interfaces on the framework side without having to change or recompile the application for this purpose.

The cost of the development and maintenance of the application is thereby reduced. By virtue of this associated functionality, the term "zero-admin-deployment" in this context signifies that all administrative costs for the respective deployments of the application are avoided. The parallel creation and maintenance of source code masters for different deployments are therefore completely separate from the respective application.

It is also advantageous that the creation of the software architecture of the respectively encapsulated layers takes place automatically on the basis of the predetermined platforms and/or runtime locations within a connectable computer network. The method supports the developer not only in the selection of the respectively required interconnection interfaces within the application programming interfaces between the encapsulated layers, but also in the arrangement and implementation of the encapsulated layers with regard to the anticipated deployment of the computer application According to at least one embodiment of the invention, a system is provided for producing an n-layered software application, wherein a flexible interconnection interface above the framework is configured within an application programming interface in some cases and, depending on the underlying platform of the individual encapsulated layers, the flexible interconnection interface provides the necessary communication profiles for the communication via the application programming interface between the encapsulated layers.

In an advantageous embodiment of the system, the application is encapsulated and can therefore be run on a generic runtime environment. Irrespective of the system configuration of the platforms for the respective encapsulated layers, the application which runs is likewise independent and does not need to be changed in the case of different deployments.

At least one embodiment of the present invention can be realized in the form of hardware, software or a combination of hardware and software. Any type of system or any other device which is set up for executing the method according to at least one embodiment of the invention is suitable for this. A typical combination of hardware and software might be a universal computer system with a computer program that is loaded into and executed in the universal computer system, and controls the computer system such that an application which has been created in accordance with the described method is executed. In a further combination of hardware and software, e.g. a processing layer for image processing can be arranged in a special image-processing hardware, while the remaining layers are executed on conventional PC hardware. At least one embodiment of the present invention can also be integrated in a computer program product which comprises all features enabling the realization of the computer-based method described here, and which is capable of executing this method after it has been loaded into a computer system.

In the present context, the terms computer program segment, computer program and computer application are understood to mean any expression in any computer language, code or notation of a set of instructions which enable a computer system to perform data processing and thus to execute a specific function. The computer program segment, computer program or computer application can be run either directly, or following conversion into another language, code, or notation, or by way of representation in another material form on the computer system.

BRIEF DESCRIPTION OF THE DRAWINGS

In the following detailed description of the figures, without limiting the scope of the invention, example embodiments including their features and further advantages are explained with reference to the drawings, in which.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

Figure 1:
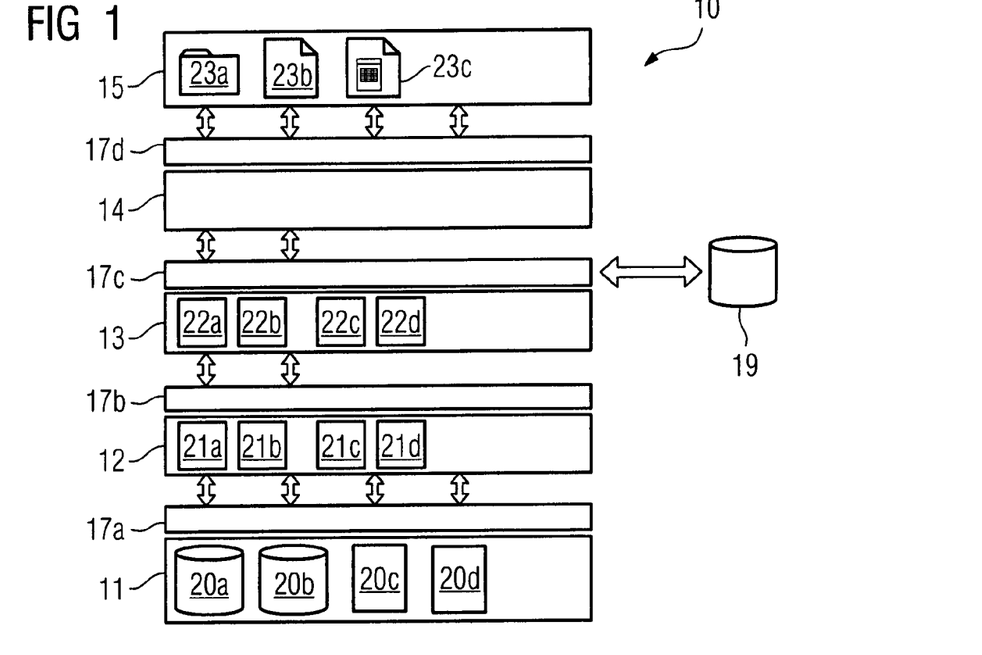
FIG. 1 shows a schematic structure of the software architecture including interconnection interfaces in accordance with an embodiment of the invention.

The figure FIG. 1 shows a five-layered software application 10, wherein the software architecture has a lowermost service layer 11, this being followed by a data access layer 12, then by a processing layer 13, then by a process layer 14 and finally a presentation layer 15. Application programming interfaces 17a,17b,17c,17d, each including an integrated interconnection interface, are respectively located between these layers 11,12,13,14,15 which are encapsulated at least partially by way of a framework. These interconnection interfaces of the application programming interfaces 17a,17b,17c,17d are flexible, thereby allowing a software architecture which, by way of configuration, can be used for all variety of deployments, i.e. for all variety of distributions of the layers 11,12, 13,14,15 on platforms and runtime locations 16a,16b within a connectable computer network, without any source code adaptation of the interconnection interfaces being required for this purpose. Only the communication profiles of the interconnection interfaces which are integrated in the application programming interfaces 17a,17b,17c,17d need be adapted to the deployment concerned. The adaptation of the interconnection interfaces can take place either in the context of a compilation or by way of dynamic linking to files of a database 19, e.g. as XML or DLL configuration files.

The relevant services, data or components 20a,20b,20c, 20d,21a,21b,21c,21d,22a,22b,22c,22d,23a,23b,23c of the encapsulated layer 11,12,13,14,15 concerned can be called either by the layers 11,12,13,14,15 or by the application 10 itself. The interaction via application programming interfaces 17a, 17b,17c,17d, each including an integrated interconnection interface, is symbolized by arrows in the drawing.

In this case, the communication profiles must be designed such that the services and components 20a,20b,20c,20d,21a, 21b, 21c,21d,22a,22b,22c,22d,23a,23b,23c within an application 10 can communicate with each other across the encapsulated layers 11,12,13,14,15. In this respect, the communication profiles must take into consideration and, depending on the deployment, specify and monitor client/server request/response protocols, event-based data processing, general job management and problems relating to data communication, such as synchronous data exchange, formats of data protocols and monitoring of the data communication and message formats.

Figure 2:
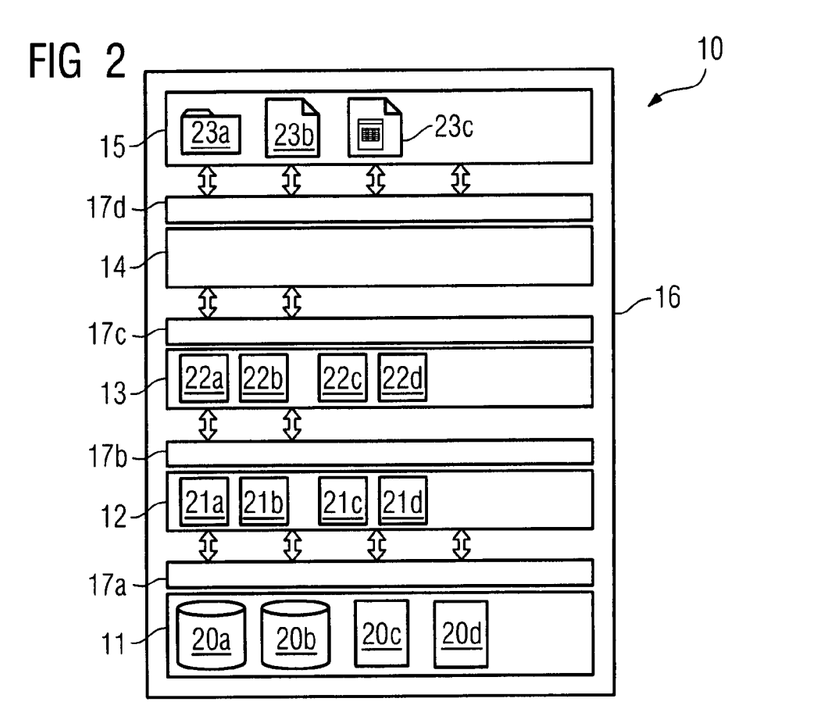
FIG. 2 shows a schematic structure of the software architecture as a fat client including interconnection interfaces in accordance with an embodiment of the invention.

The figure FIG. 2 shows the software architecture of the application 10 in the case of a fat client deployment. The software architecture does not need to be adapted for this implementation on a single computer. The communication profiles of the integrated interconnection interfaces of the application programming interfaces 17a,17b,17c,17d allow desktop use of the application 10. In this case, the encapsulated layers 11,12,13,14,15 run within their own runtime environment in each case, such that different programming languages of the encapsulated layers concerned 11,12,13,14, 15 can also be used in this type of configuration.

Figure 3:
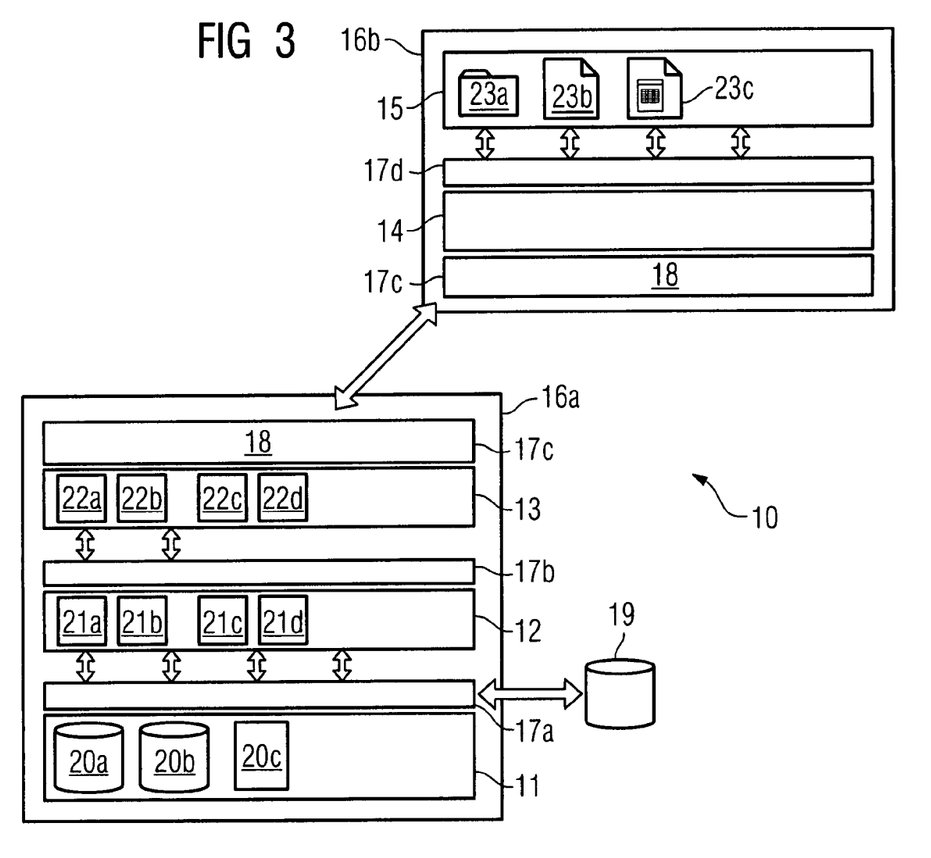
FIG. 3 shows a schematic structure of the software architecture as a rich-thin client including interconnection interfaces in accordance with an embodiment of the invention.

By contrast, the figure FIG. 3 shows a rich-thin deployment. The service layer 11, the following data access layer 12 and the processing layer 13 of the application 10 run on a first computer as a server 16a. The process layer 14 and the presentation layer 15 run on a client 16b, wherein data transfer and access to the relevant services, data and components 22a,22b,22c,22d of these layers 13,14 take place via a data interface 18 between the processing layer 13 and the process layer 14, possibly protected by way of a firewall.

Once again, the underlying software architecture does not need to be changed for either the rich-thin client deployment or for the fat client deployment, since only the communication profiles of the interconnection interfaces of the application programming interfaces 17a,17b,17c,17d need to be adapted to the deployment concerned.

Figure 4:
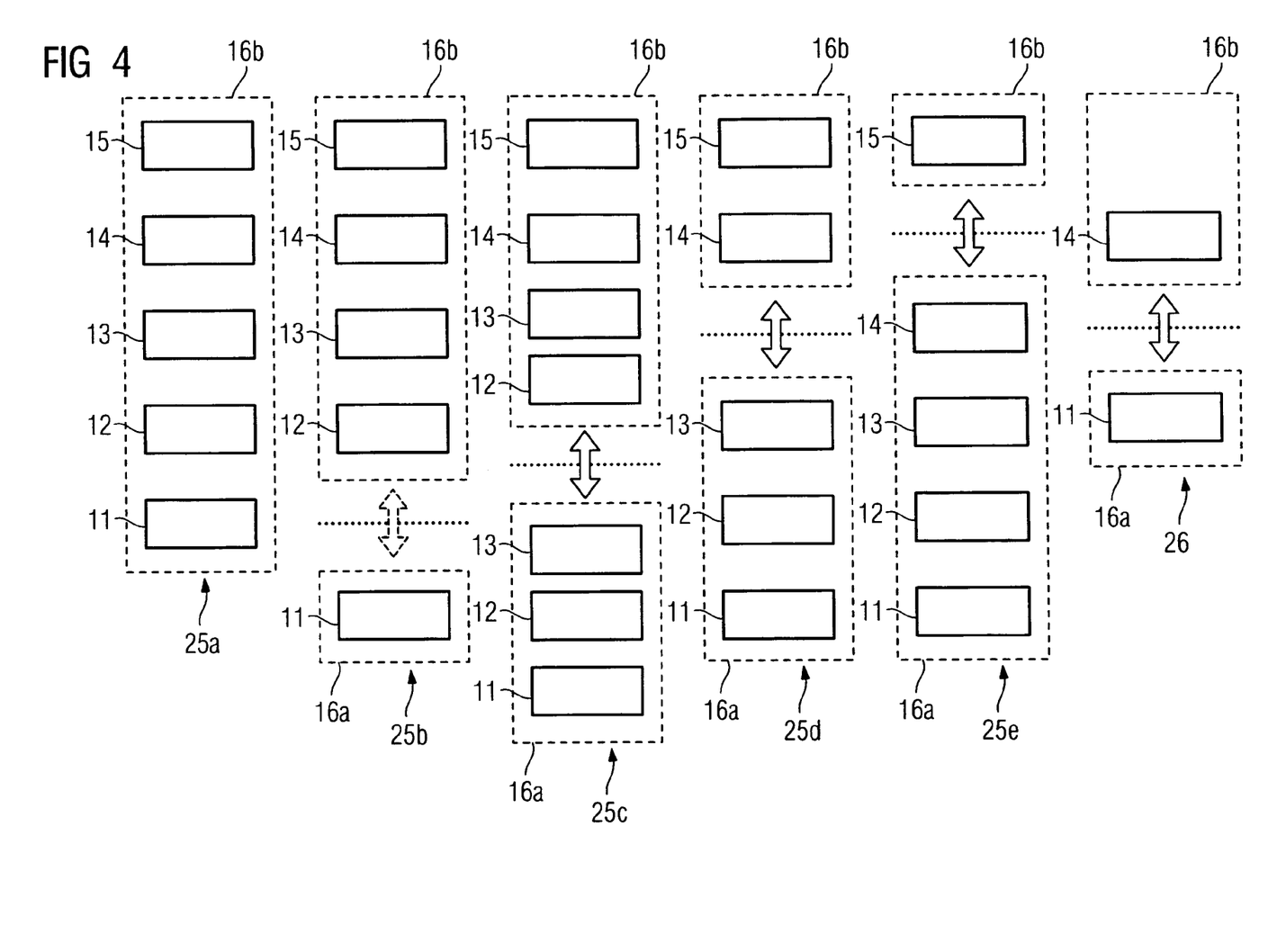
FIG. 4 shows a schematic comparison of the structure of the software architecture as a fat client, rich client, smart client, rich-thin client and thin client, and as a web service.

The above-described deployment variants fat client 25a and thin-rich client 25d are compared with further deployment variants in FIG. 4, specifically rich client 25b, smart client 25c and thin client 25e. It is also evident from FIG. 4 that these further deployment variants are derived from the previously described examples by transferring one or more layers 11 to 15 or individual parts of these layers 11 to 15 between server 16a and client 16b.

In the case of the thin client 25e, only a front-end of the presentation layer 15 is arranged on the client 16b in the manner of a web interface. The remaining parts of the presentation layer 15 and the remaining layers 11 to 14 are arranged on one or more servers 16a. In this case, the presentation layer 15 implemented in particular in HTML technology. In particular, in this case the server 16a is in turn divided into a web server which provides a user interface and exports to the client 15b, an application server which contains the layers 12 to 14, and a data server which contains the service layer 11.

In the case of the rich client 25b, however, the layers 12 to 15 are arranged on the client side. Only the service layer 11 is arranged on one or more servers 16a, in particular a data cluster. In the rich client deployment, the application 10 can be used at least to a large extent in offline use. In order to utilize specific services, e.g. for loading image data, the client 16b can be connected to the server 16a.

In the case of the smart client 25c, components of the processing layer 13 and the data access layer 12 are distributed on the client 16b, and other components of these layers 12 and 13 are distributed on one or more servers 16a. In the smart client deployment, and unlike the rich client, the application 10 cannot be operated without a permanent network connection with the server 16a. However, the division of the layers 12 and 13 between client 16b and server 16a allows the performance of the application 10 to be optimized particularly efficiently by adapting to the computing and storage capacity of client 16b and server 16a and to the available data transmission capacity of the network.

According to at least one embodiment of the invention, the application can be operated on the basis of a single source code master in all illustrated deployment variants. The individual layers 11 to 15 of the application can also have different versions in this case. The application merely has to be configured accordingly in order to adapt to a specific deployment in this case. Furthermore, in a deployment which is likewise illustrated in FIG. 4, the service layer 11 and the process layer 14 can also be operated in isolation as a pure web service 26.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer implemented method comprising:
producing a software application including five layers, the five layers including,
a service layer providing at least one of local and external services for a framework,
a data access layer providing at least one of local and external data and communication services,
a processing layer providing at least one of processing services and processing components,
a process layer providing at least one of business logic and a service bus, and
a presentation layer for presenting at least one of data and components, services and components for each layer being assigned to and bound to a particular layer, each layer being encapsulated in a generic runtime environment so that each layer can be run individually and independently of a platform or a runtime location, the generic runtime environment executing platform-independent code such that the software application remains unchanged regardless of a deployment scheme selected from among different deployment schemes of the five layers, and the encapsulated layers being able to communicate with each other via an application programming interface, the application programming interface including an interconnection interface; and
providing, by the interconnection interface, communication profiles for the communication between the encapsulated layers based on underlying platforms, the interconnection interface facilitating the communication between the encapsulated layers using a configuration file, the interconnection interface being flexible and adaptable by way of the configuration file, the interconnection interface being adaptable without source code modification to any of the different deployment schemes and without recompilation of the software application, the different deployment schemes being platform independent and independent of application compilation, the communication profiles being implemented when the software application is used on one of the different deployment schemes, the different deployment schemes including,
a Fat Client deployment scheme in which all five layers are deployed to one platform,
a Rich Client deployment scheme in which the service layer is deployed to at least one first platform and in which the data access layer, the processing layer, the process layer and the presentation layer are deployed to a second platform,
a Smart Client deployment scheme in which the service layer is deployed to the at least one first platform, the process layer and the presentation layer are deployed to the second platform, and the data access layer and the processing layer are partly deployed to the at least one first platform and to the second platform,
a Thin-Rich Client deployment scheme in which the service layer, the data access layer and the processing layer are deployed to the at least one first platform, and the process layer and the presentation layer are deployed to the second platform, and
a Thin Client deployment scheme in which at least the service layer, the data access layer, the processing layer and the process layer are deployed to the at least one first platform and at least a frontend portion of the presentation layer is deployed to the second platform.

2. The method of claim 1, wherein each of the at least five encapsulated layers includes intermediate application programming interfaces with a relevant integrated interconnection interface.

3. The method of claim 1, wherein
the encapsulated processing layer and the encapsulated process layer are runnable on different interconnectable runtime locations within a computer network, and
the providing provides at least one of the communication profiles between the encapsulated processing layer and the encapsulated process layer and data communication between data interfaces of the computer network.

4. The method of claim 1, wherein the services and components, implemented in the encapsulated layers, comply with a standardized application programming interface.

5. The method of claim 1, wherein at least one of standardized services, components and data is implemented in the encapsulated processing layer and the encapsulated process layer and is independently invokable.

6. The method of claim 1, further comprising:
specifying the platforms and the relevant runtime locations within a computer network of the encapsulated processing layer and the encapsulated process layer; and
selecting the communication profiles required for the specified platforms and runtime locations automatically.

7. The method of claim 1, wherein at least one of the communication profiles of the application programming interfaces and the communication profiles of the data interfaces are implemented dynamically based on the platforms and runtime locations within a computer network of the encapsulated processing layer and the encapsulated process layer.

8. The method of claim 1, wherein the software application organizes access to the processing encapsulated layer and the process encapsulated layer and at least one of services, components and data of the processing encapsulated layer and the process encapsulated layer, the software application being runnable as an encapsulated application, independent of a deployment underlying a software architecture.

9. The method of claim 1, further comprising:
creating a software architecture of the processing encapsulated layer and the process encapsulated layer automatically based on at least one of platforms and runtime locations within a connectable computer network.

10. The method of claim 2, wherein the at least five encapsulated layers are runnable on different interconnectable runtime locations within a computer network, and wherein the interconnection interfaces of the application programming interfaces provide at least one of the communication profiles between the at least five encapsulated layers and data communication between data interfaces of the computer network.

11. The method of claim 2, wherein at least one of services, components and data, implemented in the at least five encapsulated layers, complies with at least one of standardized application programming interfaces and standardized data interfaces.

12. A system for producing a software application including five layers, the five layers including a service layer for providing at least one of local and external services for a framework, a data access layer for providing at least one of local and external data and communication services, a processing layer for providing at least one of processing services and processing components, a process layer for providing at least one of business logic and a service bus, and a presentation layer for presenting at least one of data and components, the system comprising:
a non-transitory computer readable medium including software code that, when executed on a computer hardware device, cause the computer hardware device to encapsulate each layer in a generic run time environment so that each layer can be run individually and independently of platform or runtime location, the generic runtime environment executing platform-independent code such that the software application remains unchanged regardless of a deployment scheme selected from among different deployment schemes of the five layers, the encapsulated layers being able to communicate with each other via an application programming interface, services and components for each layer being assigned to and bound to a particular layer, the application programming interface being an interconnection interface, the interconnection interface providing communication profiles for the communication between the encapsulated layers based on underlying platforms of the encapsulated layers, the interconnection interface facilitating the communication between the encapsulated layers using a configuration file, the interconnection interface being flexible and adaptable by way of the configuration file, the interconnection interface being adaptable without any source code modification to any of the different deployment schemes and without recompilation of the software application, the different deployment schemes being platform independent and independent of application compilation, the communications profiles being implemented when the software application is used on one of the different deployment schemes, the different deployment schemes including,
a Fat Client deployment scheme in which all five layers are deployed to one platform,
a Rich Client deployment scheme in which the service layer is deployed to at least one first platform and in which the data access layer, the processing layer, the process layer and the presentation layer are deployed to a second platform,
a Smart Client deployment scheme in which the service layer is solely deployed to the at least one first platform, the process layer and the presentation layer are solely deployed to the second platform, and the data access layer and the processing layer are partly deployed to the at least one first platform and to the second platform,
a Thin-Rich Client deployment scheme in which the service layer, the data access layer and the processing layer are deployed to the at least one first platform, and the process layer and the presentation layer are deployed to the second platform; and
a Thin Client deployment scheme in which at least the service layer, the data access layer, the processing layer and the process layer are deployed to the at least one first platform and at least a frontend portion of the presentation layer is deployed to the second platform.

13. A system for producing a software application including five layers, the five layers including a service layer for providing at least one of local and external services for a framework, a data access layer for providing at least one of local and external data and communication services, a processing layer for providing at least one of processing services and processing components, a process layer for providing at least one of business logic and a service bus, and a presentation layer for presenting at least one of data and components, the system implemented with computer hardware and software and comprising:
a framework to encapsulate each layer in a generic run time environment so that each layer can be run individually and independently of a platform or a runtime location, the generic runtime environment executing platform-independent code such that the software application remains unchanged regardless of a deployment scheme selected from among different deployment schemes of the five layers, the encapsulated layers able to communicate with each other via an application programming interface, services and components for each layer being assigned to and bound to a particular layer, the application programming interface being an interconnection interface, the interconnection interface to provide communication profiles for the communication between the encapsulated layers based on underlying platforms of the encapsulated layers, the interconnection interface facilitating the communication between the encapsulated layers using a configuration file, the interconnection interface being flexible and adaptable by way of the configuration file, the interconnection interface being adaptable without any source code modification to any of the different deployment schemes and without recompilation of the software application, the different deployment schemes being platform independent and independent of application compilation, the communications profiles being implemented when the software application is used on one of the different deployment schemes, the different deployment schemes including, a Fat Client deployment scheme in which all five layers are deployed to one platform, a Rich Client deployment scheme in which the service layer is deployed to at least one first platform and in which the data access layer, the processing layer, the process layer and the presentation layer are deployed to a second platform, a Smart Client deployment scheme in which the service layer is solely deployed to the at least one first platform, the process layer and the presentation layer are solely deployed to the second platform, and the data access layer and the processing layer are partly deployed to the at least one first platform and to the second platform, a Thin-Rich Client deployment scheme in which the service layer, the data access layer and the processing layer are deployed to the at least one first platform, and the process layer and the presentation layer are deployed to the second platform; and a Thin Client deployment scheme in which at least the service layer, the data access layer, the processing layer and the process layer are deployed to the at least one first platform and at least a frontend portion of the presentation layer is deployed to the second platform.

14. A computer program product stored on a non-transitory computer-readable medium and including computer-readable program segments that, when executed, cause a computer to carry out the method of claim 1.

15. A non-transitory computer readable medium including program segments stored thereon, the computer program segments, when executed on a computer device, causing the computer device to implement the method of claim 1.

* * * * *